(No Model.)
D. DOWD.
CUTTING AND FEEDING ATTACHMENT FOR THRASHING MACHINES.
No. 279,725. Patented June 19, 1883.
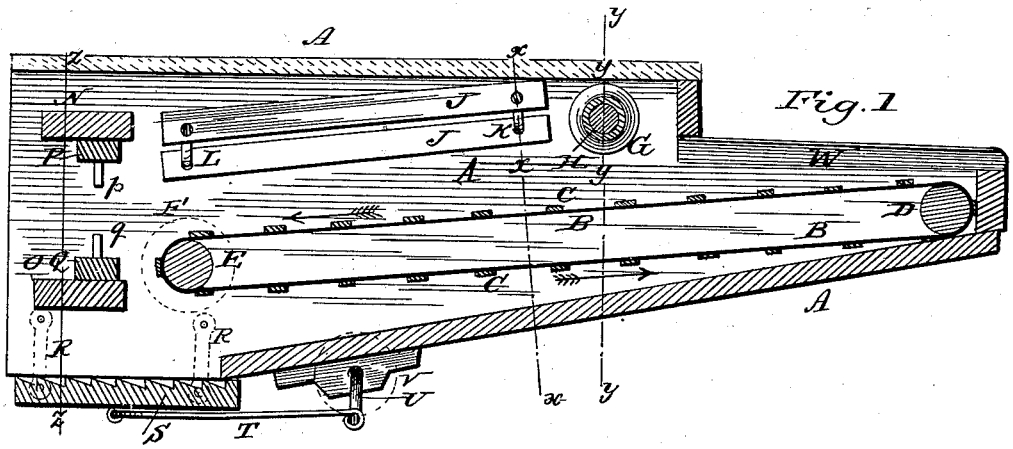
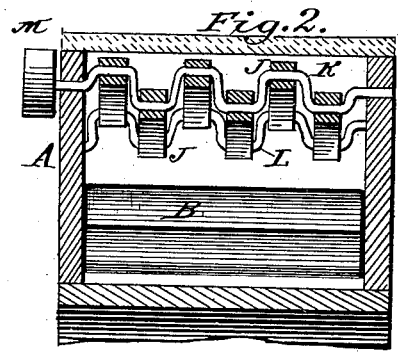
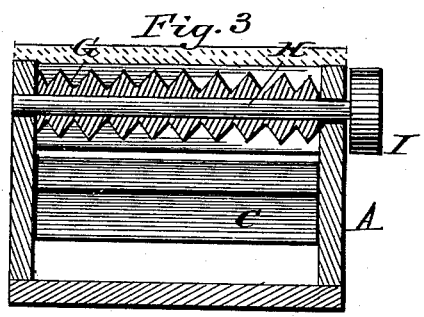
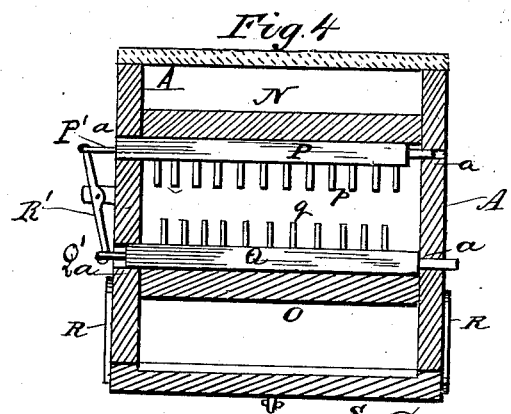
WITNESSES:
Fred. G. Dieterich
Arthur L. Morsell
Daniel Dowd
INVENTOR.
By Louis Bagger & Co.
ATTORNEYS

UNITED STATES PATENT OFFICE.

DANIEL DOWD, OF LARUE, OHIO.

CUTTING AND FEEDING ATTACHMENT FOR THRASHING-MACHINES.

SPECIFICATION forming part of Letters Patent No. 279,725, dated June 19, 1883.

Application filed April 16, 1883. (No model.)

*To all whom it may concern:*

Be it known that I, DANIEL DOWD, of Larue, in the county of Marion and State of Ohio, have invented certain new and useful Improvements in Cutting and Feeding Attachments for Thrashing-Machines; and I do hereby declare that the following is a full, clear, and exact description of the invention, which will enable others skilled in the art to which it appertains to make and use the same, reference being had to the accompanying drawings, which form a part of this specification, and in which—

Figure 1 is a longitudinal vertical section of my improved cutting and feeding attachment to thrashing-machines. Fig. 2 is a cross-section of the same through line $x\,x$ in Fig. 1. Fig. 3 is a similar view through the rotating cutting-cylinder on line $y\,y$ in Fig. 1; and Fig. 4 is a cross-section through line $z\,z$ in the same figure, showing the reciprocating rake-bars for scattering the cut bundles of grain.

Similar letters of reference indicate corresponding parts in all the figures.

My invention has relation to cutting and feeding attachments for thrashing-machines, adapted to feed the grain to be thrashed evenly to the concave of the thrashing-machine by cutting the bands holding the bundles of grain together, and then scattering the grain-bundles so that it will be received in an even layer in the concave of the machine, and thus subjected to the even action of the thrashing-cylinder, substantially as hereinafter more fully described, and particularly pointed out in the claim.

In the accompanying drawings, A is the frame or casing of my improved attachment, which may be attached removably to a thrashing-machine, (not shown in the drawings,) so that the grain will be fed from the attachment into the concave of the thrashing-machine.

B is an endless band having cross-pieces or cleats C, which will prevent the grain from slipping. The band or apron B is carried upon and operated by drums or rollers D and E, one of which should have a pulley for rotating it, and thereby causing apron B to travel in the direction of the arrows.

G is the cutting-cylinder, which consists of a series of sharp-edged disks keyed or otherwise secured upon the shaft H, which has a pulley, I, for rotating it. Operating in conjunction with the traveling feed-apron B are the feed-bars J, which consist of a series of parallel strips or bars hung upon and actuated by crank-arms K and L, one of which, K, has a pulley, M, for rotating it. Thus it will be seen that when pulley M is rotated the bars J will have an up-and-down motion—that is to say, alternate arms will be elevated while the arms alternating with these will be depressed—thereby, in conjunction with the traveling apron B, operating to feed the grain in the direction in which the top part or upper face of the apron travels.

Fixed in the rear end of the frame or casing A are two cross bars, N and O, between which the grain is fed to the distributing or scattering rake-bars P and Q, which are armed, respectively, with rake-teeth, (shown at $p$ and $q$.) A reciprocating motion in opposite directions is imparted to the rake-bars P and Q by a rocking lever, R', pivoted to rock transversely to the casing, and attached to the extended ends P' and Q' of the bars, or by any other suitable means, the outer ends of said bars having their bearings in the side pieces of the casing A, as shown at $a\,a$ in Fig. 4 of the drawings.

Underneath the bottom cross-bar, O, in the rear end of the frame, is hung in hangers R R the vibrating shoe S, which is actuated by a pitman, T, which is operated by a crank-shaft, U, which has a pulley, V, at one end. The several pulleys for rotating the cutting-cylinder G, crank-shaft K, drum or cylinder E, and crank-shaft U are operated by one or more endless belts, so that they will all be rotated in unison with one another and at approximately the same degree of speed. The bottom of the vibrating shoe S is serrated, like the teeth of a saw, so as to feed grain which drops from the feed-apron into the concave of the thrashing-machine.

The operation of this device will readily be understood without requiring further explanation. The bundles of grain are fed into the attachment through the opening W at the front end of the same, and are carried by the endless apron B underneath the cutting-cylinder G, by which the bands are cut, and the loose grain is fed between the feed-arms J and the apron, between the transverse reciprocating rake-arms P and Q, which effectually scatter the grain, so that it will be received into the concave of the thrashing-machine in a thin and even layer.

Having thus described my invention, I claim and desire to secure by Letters Patent of the United States—

In a cutting and feeding attachment for thrashing-machines, the combination of the casing A, the rollers D and E, the endless apron B, having transverse cleats C, cutting-cylinder G, shaft H, pulley I, feed-bars J, their crank-shafts K and L, said shaft K having pulley M, shoe S, means for vibrating the same, cross-bars N and O, fixed transversely in the rear end of the machine, rake-bars P and Q, reciprocating in bearings $a\,a$ in the sides of the casing, and means for reciprocating said rake-bars alternately in opposite directions, as described, the whole constructed to operate in the manner and for the purpose shown and set forth.

In testimony that I claim the foregoing as my own I have hereunto affixed my signature in presence of two witnesses.

DANIEL DOWD.

Witnesses:
W. J. CAMPBELL,
W. A. SEFFNER.